Feb. 21, 1950　　　W. A. PENNOW ET AL　　　2,498,294
LIGHT PROJECTOR

Filed Nov. 30, 1945　　　　　　　　　　　　3 Sheets-Sheet 1

WITNESSES:　　　　　　　　　　　　　　　　INVENTORS
　　　　　　　　　　　　　　　　　　　　　Willis A. Pennow and
　　　　　　　　　　　　　　　　　　　　　Robert T. Burns.
　　　　　　　　　　　　　　　　　　　　BY
　　　　　　　　　　　　　　　　　　　　　　ATTORNEY

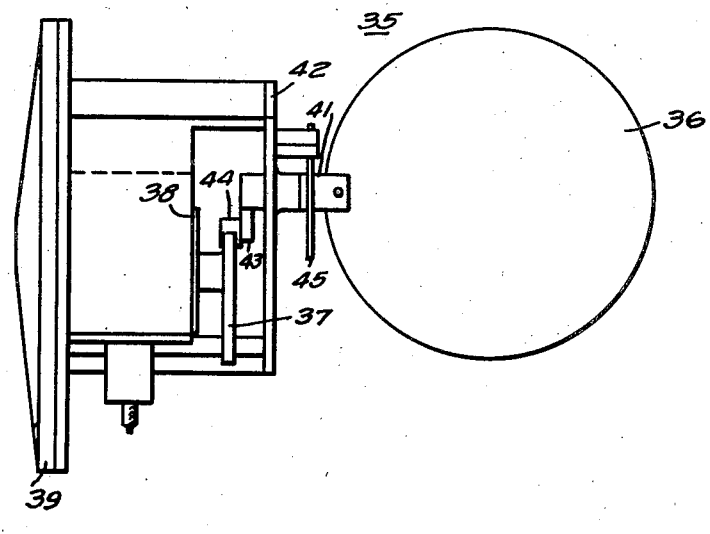
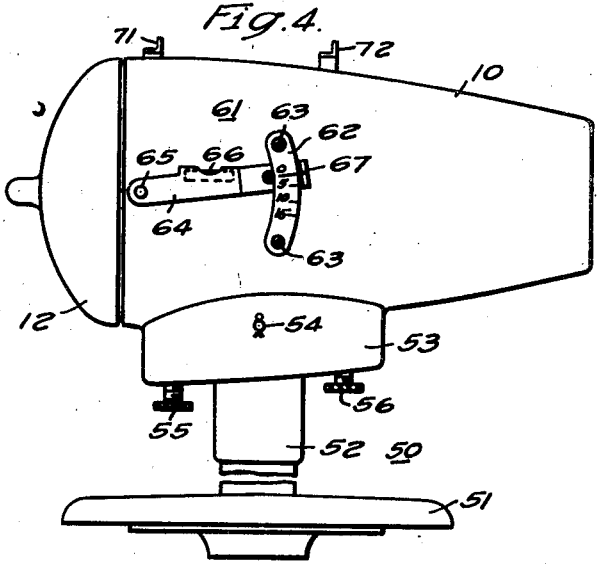

Feb. 21, 1950 W. A. PENNOW ET AL 2,498,294
LIGHT PROJECTOR

Filed Nov. 30, 1945 3 Sheets-Sheet 3

WITNESSES:

INVENTORS
Willis A. Pennow and
Robert T. Burns.
BY
ATTORNEY

Patented Feb. 21, 1950

2,498,294

UNITED STATES PATENT OFFICE 2,498,294

LIGHT PROJECTOR

Willis A. Pennow, Cleveland, and Robert T. Burns, Lakewood, Ohio, assignors to Westinghouse Electric Corporation, East Pittsburgh, Pa., a corporation of Pennsylvania Application November 30, 1945, Serial No. 632,045

9 Claims. (Cl. 177—352)

Our invention relates, generally, to light projectors and, more particularly, to a lighting device for projecting a multi-colored beam of light and the lens system thereof suitable for use as a glide or approach angle indicating light at airports, or as a range light for marking and indicating channels and other courses on water to be followed by boats and the like.

Heretofore, various kinds of devices have been used as aids to air and water navigation. At airports, for example, several different types of runway marker or contact lights are commonly employed to indicate the proper runway to the pilot for effecting landing operations at night. Likewise, various kinds of lighting devices are used to indicate the proper channel to be followed by boats on rivers and harbors.

In the case of airports, it is highly desirable that the pilot of a landing aircraft be given an accurate indication of the proper glide or approach angle to be followed when landing on any runway at night. The runway marker or contact lights and other lighting aids in common use are not adequate for this purpose as their function primarily is to indicate or outline the runway. In some instances, the terrain of the approach area is such that night landing operations are hazardous even with these commonly used lighting aids. To enable the pilot to make a safe landing at night regardless of all other lights or lighting aids which may be present and in operation, it is necessary to project a beam of light at the proper angle to the runway surface of such character as to not only provide a proper glide or approach angle, but also a definite indication of any appreciable deviation from this angle.

Accordingly, it is an object of our invention, generally stated, to provide a light projector suitable for use at airports and on water ways for definitely indicating a proper path of travel for night operations of air and water craft, which shall be of simple and economical construction and reliable in operation.

A more specific object of our invention is to provide for protecting a beam of light having predetermined zones of different distinct coloration from a single projector employing a single light source.

Another object of our invention is to provide a light projector of the character described which shall function to project a beam of interrupted light of different colors in predetermined zones of the beam to give the pilot of an approaching aircraft a positive visual indication of the proper angle of glide or approach for landing at night.

A further object of our invention is to provide a light projector of the character described which may be readily adjusted both in the vertical and horizontal planes to indicate the proper glide or approach angle of aircraft of different types.

Another object of our invention is to provide a light projector of the character described wherein a single light source and a lens assembly function to produce a beam of light of different colors in predetermined angular relation in a predetermined zone or zones of distribution.

Another object of our invention is to provide a light projector of the character described which shall function to project a beam of flashing light having zones of different colors from a single light source.

A further object of our invention is to provide a lens system for use in light projectors and the like wherein the image lens is so combined with the collector lenses that the system functions to give a true inverted reproduction of the image from a short distance in front of the lens system to infinity.

A still further object of our invention is to provide a lens system for use in light projectors to project a beam of multi-colored light wherein the multi-colored image lens is positioned between two of a plurality of collector lenses in such manner that the light rays are colored and the coloration of the beam determined as the light rays are passing through these two collector lenses, thereby providing a lens system having a universal focus.

These and other objects of our invention will become more apparent from the following detailed description of a preferred embodiment of our invention when considered in connection with the drawings, in which:

Fig. 3 is a side elevational view of the light interrupter assembly used in the projector of Fig. 1;

Fig. 4 is a side elevational view of the light projector of Fig. 1 showing details of the graduated scale and levelling quadrant arm;

In practicing our invention in its preferred form, the light projector comprises a barrel-shaped housing having a hinged back carrying a spherical light reflector and a socket for supporting a lamp in front of the reflector, and a cover glass at the front end of the housing. A lens system is mounted between the light source and the cover glass and comprises a combination collector and image lens assembly mounted adjacent the light source or lamp and an objective lens mounted adjacent the cover glass. A light interrupter comprising a motor-driven cam-operated shutter is mounted between the lens assembly and the objective lens to interrupt the light beam in a predetermined manner to produce a flashing signal light. The collector and image lens assembly is so arranged that the image lens, which in this particular instance is colored red, green, and yellow in different zones, is positioned between two of the collector lenses constituting the second and third stages of the collector lens system so that a true inverted reproduction of the image lens occurs from a short distance in the front of the assembly to infinity, thus providing a universal focus lens system. The housing is pivotally mounted on a rotatable support so that it may be adjusted both horizontally and vertically to direct the light beam in any desired direction and at any desired angle with respect to ground level. The housing is provided with a pair of sights for aligning the housing or projector on the approach path, and is also provided with a graduated scale and a level quadrant arm cooperative therewith to accurately aim the projector when installing it to indicate the proper approach path.

Figure 1:
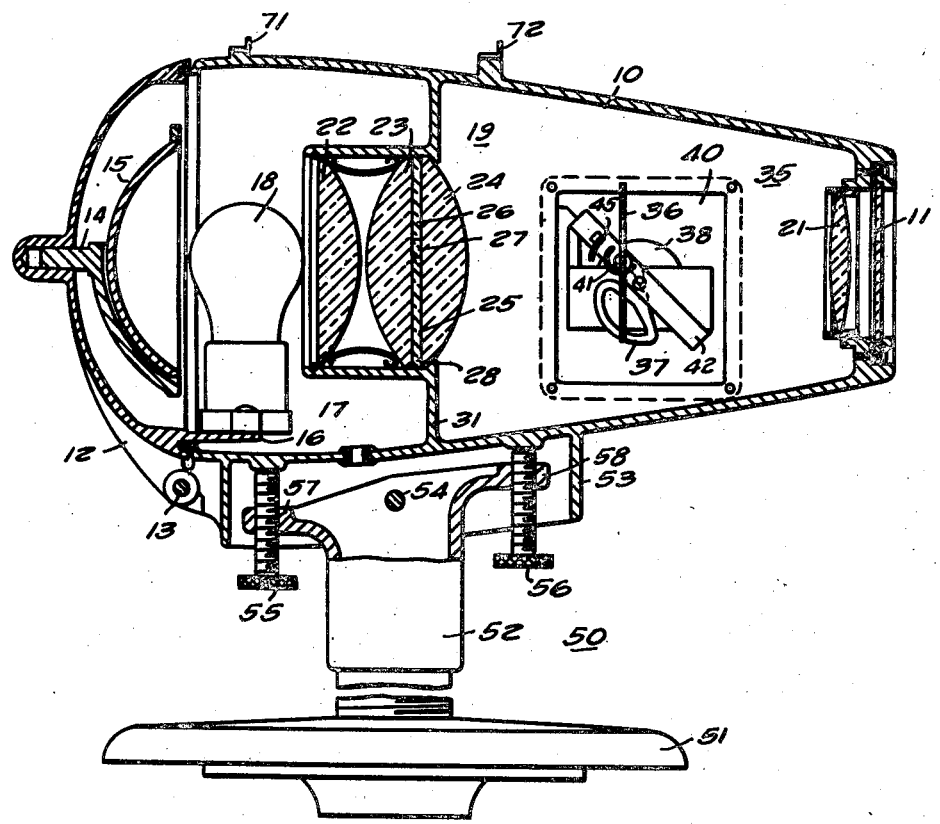
Figure 1 is a partial sectional view, in elevation, of a light projector embodying the principal features of our invention which is particularly adapted for use at airports as a glide or approach angle indicator.

Referring now to the drawings and to Fig. 1 in particular, there is shown a light projector embodying the principal features of our invention which is adapted for use at airports to indicate the proper glide or approach angle to the pilot of a landing aircraft at night. It is to be understood, however, that the principles of our invention may be applied to projectors for other uses, such, for example, as the marking of channels in rivers and harbors to guide boats operating at night.

The light projector shown in Fig. 1 comprises a barrel-shaped housing 10 open at the front end and provided with a suitable cover glass 11. The housing is provided with a back door 12 hinged thereto at 13 and which carries by means of a suitable bracket 14 a spherical reflector 15. In this instance, the hinged door 12 is also provided with a bracket 16 for supporting a lamp socket 17. This socket is utilized to support a suitable lamp 18 in proper position in front of the reflector.

The preferred lens system of the projector comprises a combined collector and image lens assembly 19 positioned in front and adjacent to the lamp 18 and an objective lens 21 mounted adjacent the cover glass 11. It will be observed that the lens assembly 19 comprises a plurality of collector lenses 22, 23, and 24 constituting a three-stage collector lens arrangement. The assembly also comprises a flat multi-colored image lens 25 positioned between the flat faces of collector lenses 23 and 24, in back-to-back relation as shown. The image lens 25 in this instance is divided transversely parallel to its horizontal axis into three color zones, the upper zone 26 being red, the middle zone 27 being green, and the lower zone 28 being yellow.

Figure 2:
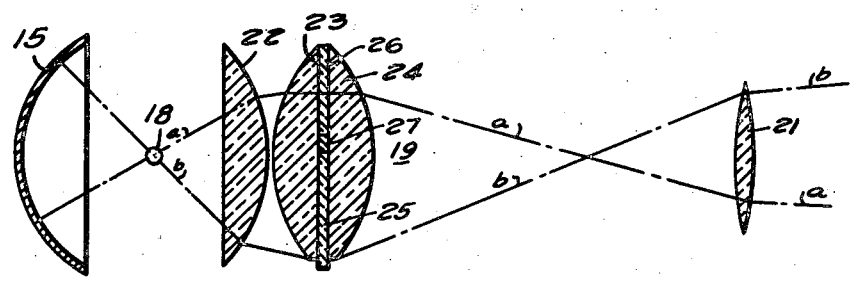
Fig. 2 is a diagrammatic view of the preferred lens system employed in the projector of Fig. 1.

Referring to Fig. 2, it will be observed that the light rays $a$ and $b$, for example, are acted upon or colored by the image lens as they pass through the collector lenses 23 and 24 constituting the second and third stages of the collector lens arrangement. In other words, the image is made a part of the collector lens arrangement so that a true inverted reproduction of the image lens occurs from a short distance in front of the collector lens assembly to infinity. This provides a universal focus lens system and produces a beam of light which is colored in various zones, as determined by the nature of the image lens and which has sharply defined color zones which are clearly visible throughout the entire range of the projector.

The collector and image lens assembly 19 may be supported within the housing in any suitable manner, such as by means of the integral bracket arrangement 31 as shown in Fig. 1. The details of the mounting of this assembly are unimportant except that the lenses must be maintained in the proper spaced relation.

In order to provide for interrupting the light beam in a predetermined manner to produce a flashing light signal having sharp definition, an interrupter assembly 35 is utilized. This assembly is in the form of a motor-driven cam-operated shutter which functions to insure full signal strength of the beam through the entire "on" time of the signal or beam and complete eclipse during the "off" time.

In this instance, the interrupter comprises a disk-shaped shutter 36 which is actuated by a cam 37 driven by a suitable motor 38. The various parts of the interrupter are supported by a mounting plate 39 which fits over a side opening 40 in the housing 10, as shown in Fig. 1. As shown in Fig. 3, the shutter 36 is rotatably mounted on a shaft 41 which is journalled in a bracket 42 attached to the plate 39, and which is provided at its other end with an arm 43 carrying a contact roller 44. The roller 44 engages the cam 37 and is made to follow the contour thereof by a suitable spiral spring 45 which functions to bias the shutter 36 in a predetermined direction.

It will be understood that when the motor 38 is operating at a constant speed to drive the cam 37, the shutter 36 will be periodically actuated to its open and closed positions in a manner determined by the contour of the cam 37. The cam 37 is so shaped that the shutter 36 is moved to its open position, that is, to a position 90° from that shown in Fig. 1 as quickly as possible and then abruptly released from that position at the end of a predetermined period.

It will be understood that while the motor 38 of the interrupter assembly operates continuously, the shutter or light controlling element thereof is not continuously operated. A continuously operated shutter introduces a diminishing and increasing strength period to the signal or beam, while an arrangement which flashes the lamp also introduces the same characteristic, and also causes a false signal by making the yellow beam appear red during that part of the signal cycle when the lamp filament temperature decays from incandescence to that of a black body after interruption of energy. In this instance, however, the interrupter assembly functions to intermittently interrupt the light beam within the housing in a predetermined manner to provide the desired flashing characteristic thereto with definite "on" and "off" periods.

The housing 10 is mounted upon a suitable standard or support 50 comprising a mounting plate 51 and a standard 52. As shown, the housing 10 is provided with an extended mounting portion 53 pivotally secured to the upper end of the standard 52 by means of a shaft or bolt 54. This permits the housing to be moved in a vertical plane. The adjustment thereof in this plane is effective by means of a pair of thumb screws 55 and 56 carried by extensions 57 and 58 on the head of the standard 52. Any other suitable supporting arrangement may be utilized.

In order to provide for accurately aiming the projector, an elevation determining device, indicated generally at 61 in Fig. 4, is utilized. This device comprises a graduated scale 62 adjustably attached to the side of the housing by means of screws 63 and a cooperating levelling quadrant arm 64 pivotally secured to the housing at 65.

The scale 62 is graduated in degrees of from 0 to 15 in this instance. The arm 64 is provided with a level 66 visibly mounted at the top thereof.

When it is desired to aim the projector to direct the beam at any angle of from 0° to 15° in this instance, the end of the quadrant arm 64 is moved until the indicating marker 67 thereon is at the proper reading on the scale 62. When the thumb screws 55 and 56 are then adjusted to move the housing into such position that the quadrant arm 64 is in a level position, as indicated by the level 66, the projector will be directed in accordance with the adjustment on the scale 62.

In addition to the device 61, the projector is also provided with a pair of open sights 71 and 72 as shown in Fig. 1. These sights are generally similar to simple open gun sights and may be used as an aid in aligning the projector when it is being installed or setting it to project a beam in an approximate path of travel of an aircraft or the like.

Figure 5:
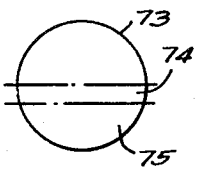
Fig. 5 is a diagrammatic view of the light beam produced by the light projector of Fig. 1 showing the various color zones of the beam.

The beam of light projected may be given any desired coloration and the color zones determined by the nature of the image lens. In this instance, it is desired to divide the beam horizontally into different colored zones, as indicated in Fig. 5. The beam may be of any predetermined size and shape, and in this instance it is a 16° circular beam with an 8° yellow portion 73, a 2° green portion 74 and a 6° red portion 75.

Figure 6:
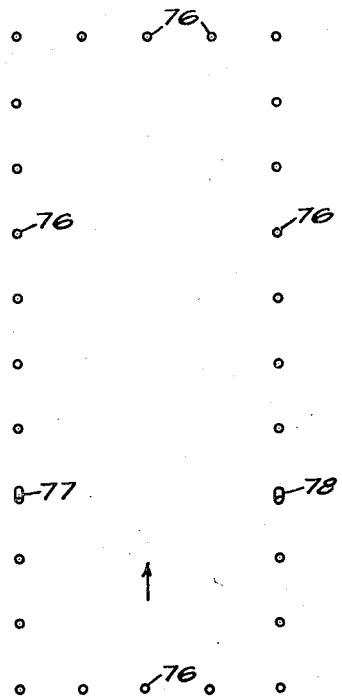
Fig. 6 is a diagrammatic view of a runway or landing strip showing how the light projector of Fig. 1 may be used as an approach or glide angle indicator at airports.
Figure 7:
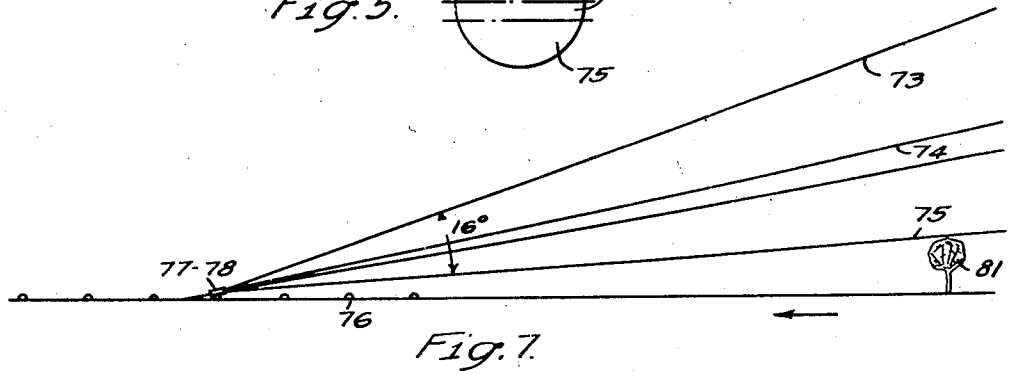
Fig. 7 is a diagrammatic view from one side of the runway as shown in Fig. 6, showing the angular position of the light beam with respect to ground level and the coloration of the beam.

The light projector may be utilized on an airport as an aid to night landing, as shown in Figs. 6 and 7. Fig. 6 is a diagrammatic view of a runway provided with the usual marker lights 76 along the sides and ends, as shown. On each side of the runway and about 500 feet from the approach end thereof, there may be mounted one of our light projectors, indicated by the numerals 77 and 78. The projectors are so aimed that they project their beams of light as indicated in Fig. 7. As shown, each beam projected is of a predetermined size, in this instance, 16°, and is multi-colored, as indicated in Fig. 5. The projector is aimed so that the lower edge of the red zone of the beam clears any obstruction such as a tree 81, and the green zone of the beam which is of narrow depth is as near to the desired glide or approach angle as possible.

As the pilot of an approaching plane nears the airport, the beams of flashing light become visible and, because of their predetermined coloration and flashing characteristic, are clearly distinguishable from all other lighting aids at the airport. So long as the pilot is in the red zone of the beam, he knows that he should gain elevation. Likewise, when he is in the yellow zone of the beam, he knows that he should decrease his elevation. By following the green zone of the beam, he can approach the runway at a proper and safe approach angle and effect a safe landing at night.

While our invention has been disclosed and described as it may be applied to a glide or approach angle indicator for use at airports, it will be understood that it may also be applied to a projector for indicating channels or other courses to be followed on water. In the embodiment shown and described, provision is made for effecting adjustment of the beam in the vertical plane. In the case of a projector for use in waterways, it would, of course be necessary to provide for effecting horizontal adjustment of the beam by mounting the housing for horizontal adjustment. In addition, it might be desirable to utilize a different color combination of the beam such, for example, as dividing the color zones vertically instead of horizontally.

In view of the foregoing, it will be apparent that we have provided a light projector which is suitable for indicating by means of a multi-colored beam of light a definite path to be followed by an aircraft when landing at night or a boat being navigated at night, and which will indicate unmistakably the vertical or horizontal zone, or both, as the case may be, in which the aircraft or boat must proceed. We have also provided a lens system of such character that a universal focus thereof is provided. This results from making the image a part of the collector lens arrangement.

While we have disclosed and described a specific embodiment of our invention, it is to be understood that changes and modifications may be made therein without departing from the principles of our invention.

We claim as our invention:

1. A light projector comprising, a barrel-shaped casing provided with a cover glass at one end and a hinged cover at the other end, a spherical reflector and a lamp socket carried by the cover, said socket functioning to support a lamp in front of the reflector, an objective lens mounted behind and adjacent to the cover glass, a combined collector and image lens assembly mounted within the casing between the lamp socket and objective lens, said assembly comprising a first stage collector lens positioned adjacent the lamp socket, second and third stage collector lenses positioned back to back in front of the first stage lens and a multi-colored image lens positioned between said second and third stage collector lenses, said image lens being divided transversely into zones of yellow, green, and red colors of predetermined depth, and a motor driven cam operated shutter interposed between the lens assembly and objective lens, said shutter being operable to intermittently interrupt the multi-colored light beam to produce a flashing light beam having sharply defined color zones of predetermined size.

2. A light projector for indicating by means of a single multi-colored light beam a path of travel comprising, a barrel-shaped housing open at the front end, a cover glass mounted in the front opening, an objective lens mounted behind the cover glass, a reflector mounted adjacent the back end of the housing, socket means for supporting a light source in front of the socket means, a combined collector and image lens assembly mounted between the socket means and the objective lens, said lens assembly comprising a plurality of collector lenses and a multicolored image lens positioned between two of said collector lenses, a rotatably mounted shutter positioned between the lens assembly and the objective lens, and means for effecting an intermittent operation of the shutter, thereby to provide for projecting a single multi-colored flashing light beam having sharply defined color zones.

3. A light projector comprising a barrel-shaped housing open at the front end and having a door at the other end, a cover glass positioned in the front opening, a spherical reflector carried by the door, a lamp socket for supporting a lamp in front of the reflector also carried by the door, an objective lens mounted behind and adjacent to the cover glass, a first collector lens mounted adjacent the lamp socket with its convex face toward the objective lens, a second collector lens mounted adjacent the first collector lens with its flat face toward the objective lens, a flat image lens with portions thereof of various colors positioned against the flat face of the second collector lens, a third collector lens mounted with its flat face against the front face of the image lens, and a motor driven cam operated shutter mounted between the objective lens and the collector and image lens assembly operable to periodically interrupt the light beam within the housing, whereby a flashing light beam of predetermined shape and size and having definite coloration in various zones as determined by the image lens is projected.

4. A light projector for producing a multi-colored light beam for signalling purposes comprising, a barrel-shaped housing having an opening in the front end and a side opening intermediate its ends, a cover glass in the front opening, means for mounting a light source at the back end of the housing, a lens system mounted in the housing for producing a multi-colored light beam, a cover plate secured to the housing over the side opening, and an electrically-operated shutter mechanism supported by said cover plate in the path of the light beam, said shutter mechanism being operable to produce a continuously flashing light signal by intermittently interrupting the light beam within the housing at predetermined intervals.

5. A light projector for producing a multi-colored beam of light comprising, a barrel-shaped housing open at the front end, a cover glass disposed in said front opening, a reflector mounted at the back end of the housing, a socket for supporting a lamp in front of the reflector, a lens system mounted in the housing between the lamp socket and cover glass for producing a multi-colored light beam, a shutter rotatably mounted in the path of the beam adjacent the front end of the housing, and means including a motor driven cam for actuating the shutter into and out of intercepting relation with respect to the beam, said cam being so shaped that the shutter is intermittently operated to produce a flashing light signal of full intensity during the "on" period and total eclipse during the "off" period.

6. A light projector comprising, a tubular casing, a light source mounted therein at one end, a reflector disposed behind the light source to project a beam of light out of the casing, an objective lens mounted at the opposite end of the casing, a lens system including a plurality of collector lenses and an image lens positioned between a pair of the collector lenses mounted in the casing, and a light interrupter including a motor-operated shutter interposed between the collector lenses and the objective lens for producing a continuously flashing light beam having a pattern as determined by the image lens.

7. The combination in a light projector, of a housing open at the front end and having a side opening adjacent thereto, a spherical reflector mounted at one end of the housing, a light source mounted at the focal point of the reflector, an objective lens spaced therefrom at the front end of the housing, a first collector lens positioned adjacent the light source with its flat face intercepting light rays from the source, second and third collector lens mounted between the first collector lens and the objective lens in back to back relation, a flat multi-colored image lens positioned between said second and third collector lenses with its faces in engagement with the flat faces of said collector lenses, support means within the housing for holding all of said lenses in predetermined fixed spaced relation, thereby to provide a universal focus lens system that reproduces a true inverted image of the image lens from a short distance in front of the collector lens assembly to infinity, and means including a motor-operated shutter mechanism mounted on the cover plate with the shutter in the path of the light beam and operable to periodically interrupt the light beam within the housing.

8. A light projector for use at airports to indicate to the pilot of an approaching aircraft by means of a multi-colored light beam the proper angle of glide or approach to be followed in landing comprising, a generally barrel-shaped housing open at one end and having a door at the other end, means at the door end of the housing to support a light source, a light omitting cover glass at the opposite open end of the housing, a reflector mounted on the door behind the light source position to project light through the cover glass, a lens system including a plurality of collector lenses and an image lens positioned between two of said collector lens, support means within the housing for supporting the lenses of said lens system in a predetermined fixed relationship between the light source position and the cover glass, said image lens being multi-colored in a plurality of horizontally divided zones, and light interrupter means interposed between the lens system and glass cover and operable to intermittently interrupt the light beam, thereby to provide for projecting an interrupted multi-colored beam of light with sharply defined color zones.

9. A light projector comprising, a barrel-shaped housing open at the front end and having a hinged door at the rear end, a cover glass mounted in said front opening, a reflector mounted in the rear end of the housing on the hinged door, a socket also carried by the door for mounting a light source in front of the reflector, an objective lens positioned behind the cover glass, a lens supporting bracket mounted within the housing between the light source and objective lens, a lens system mounted on said supporting bracket, said system comprising a plurality of collector lenses and a multi-colored image lens positioned between two of the collector lenses, and electronically-operated light interrupter means interposed between the said lens system and the objective lens to produce a continuously flashing beam of projected light colored in predetermined sharply defined zones.

WILLIS A. PENNOW.
ROBERT T. BURNS.

REFERENCES CITED

The following references are of record in the file of this patent:

UNITED STATES PATENTS

| Number | Name | Date |
|---|---|---|
| 282,376 | Rogers | July 31, 1883 |
| 990,303 | Shreiner | Apr. 25, 1911 |
| 1,384,658 | Benard | July 12, 1921 |
| 1,499,059 | Velsea | June 24, 1924 |
| 1,656,110 | Foltis | Jan. 10, 1928 |
| 1,665,426 | Verdich | Apr. 10, 1928 |
| 1,741,642 | McCarthy | Dec. 31, 1929 |
| 1,761,811 | Bone | June 3, 1930 |
| 1,830,041 | Sperry | Nov. 3, 1931 |
| 2,287,345 | Erickson | June 23, 1942 |
| 2,344,263 | Perkins | Mar. 14, 1944 |
| 2,365,038 | Adler | Dec. 12, 1944 |
| 2,386,268 | Roper | Oct. 9, 1945 |
| 2,390,109 | Liebmann | Dec. 4, 1945 |
| 2,391,430 | Macek | Dec. 25, 1945 |
| 2,431,240 | Gausch | Nov. 18, 1947 |
| 2,441,877 | Flett | May 18, 1948 |

FOREIGN PATENTS

| Number | Country | Date |
|---|---|---|
| 288,547 | Germany | Nov. 6, 1916 |